Dec. 8, 1942. E. A. SCHMIDT 2,304,710
TESTER FOR BATTERY CONTAINERS
Filed April 27, 1940 2 Sheets-Sheet 1
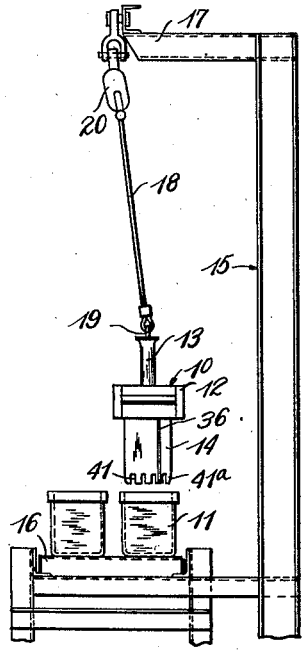
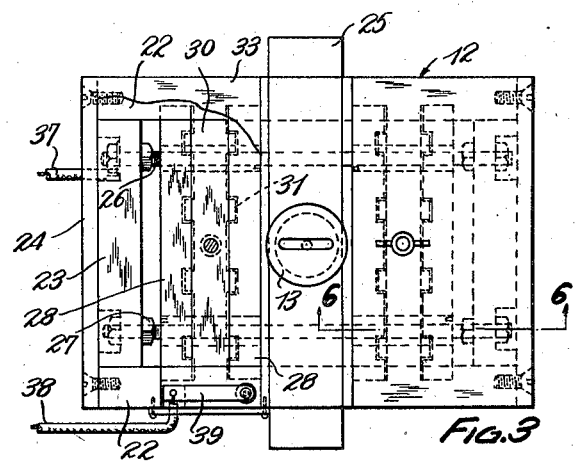
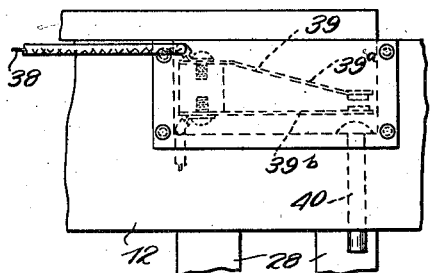
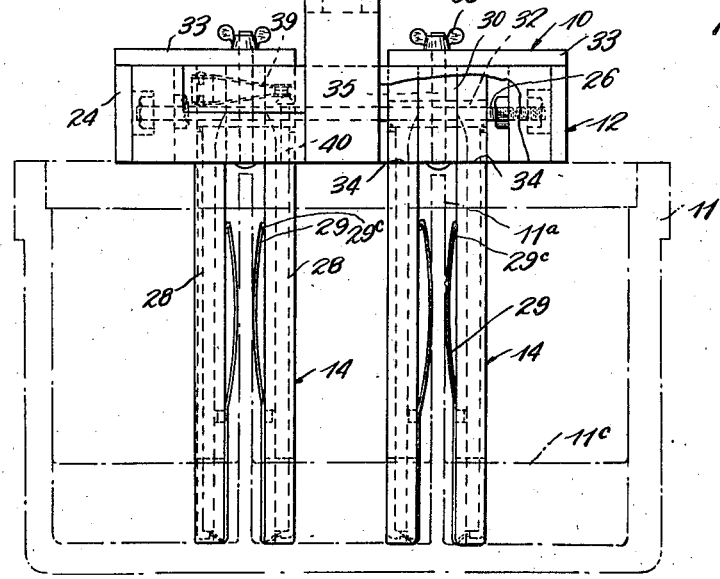
INVENTOR.
ELMER A. SCHMIDT
BY
Kwis Hudson Kent
ATTORNEYS Dec. 8, 1942.　　　E. A. SCHMIDT　　　2,304,710
TESTER FOR BATTERY CONTAINERS
Filed April 27, 1940　　　2 Sheets-Sheet 2
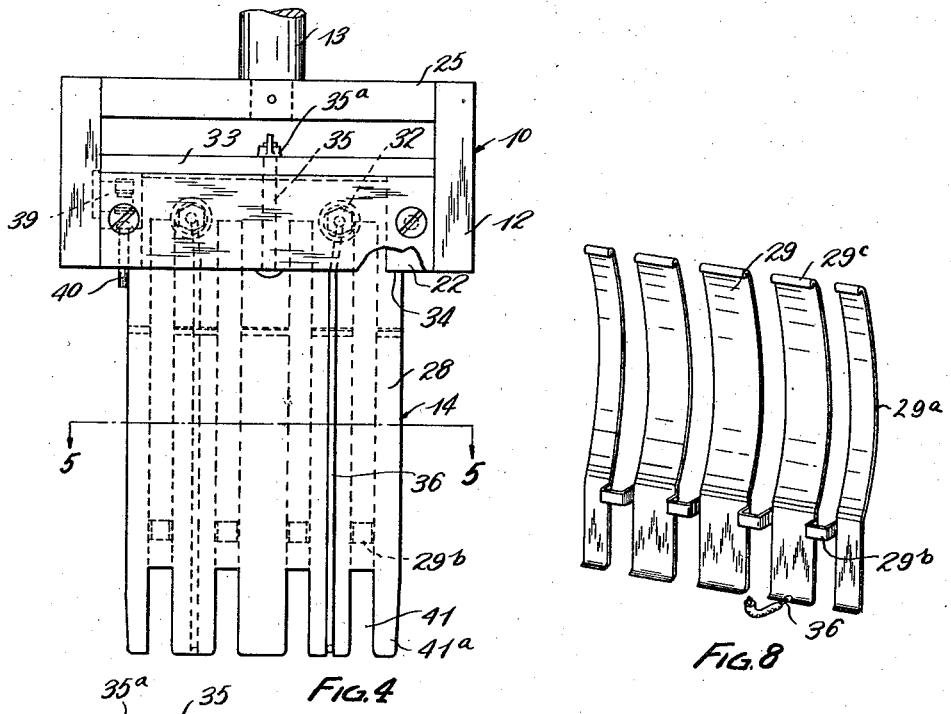
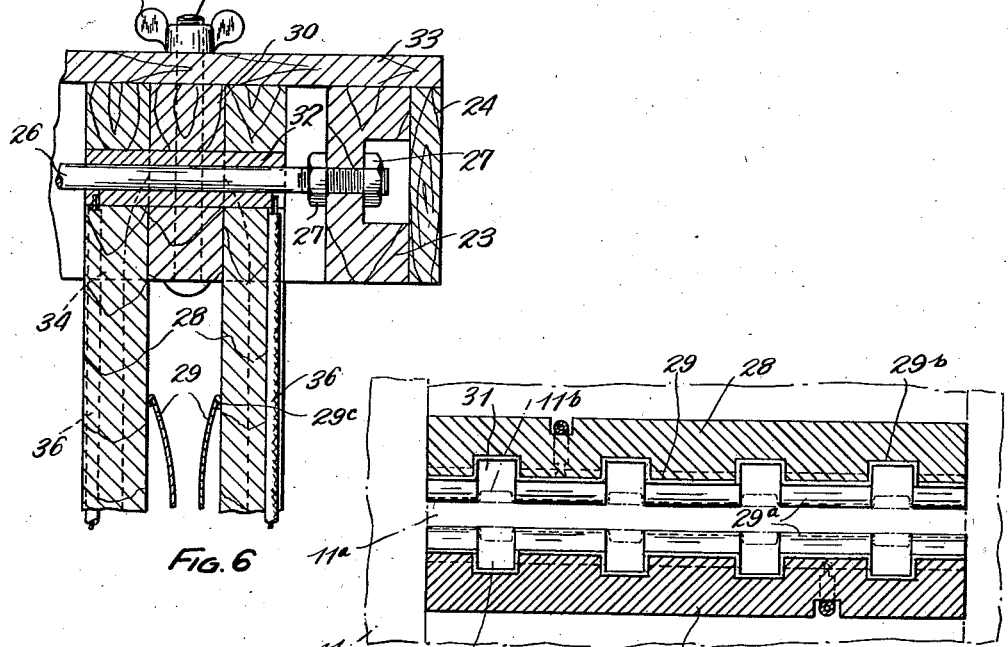
INVENTOR.
ELMER A. SCHMIDT
BY
Kwis Hudson & Kent
ATTORNEYS Patented Dec. 8, 1942

2,304,710

UNITED STATES PATENT OFFICE 2,304,710

TESTER FOR BATTERY CONTAINERS

Elmer A. Schmidt, Cleveland, Ohio, assignor to Willard Storage Battery Company, Cleveland, Ohio, a corporation of West Virginia Application April 27, 1940, Serial No. 332,035

7 Claims. (Cl. 175—183)

This invention relates to the testing of battery containers, and more particularly to testing apparatus of the type utilizing electric current of relatively high voltage for determining the presence of imperfections in battery containers.

An object of my invention is to provide improved battery container testing apparatus of this kind which can be more conveniently and more rapidly used than similar apparatus heretofore employed and which does not require tipping or inversion of the battery container during the testing thereof.

Another object of my invention is to provide improved apparatus of the type referred to in which the testing device is of a portable nature adapted to be easily and safely handled by a workman and can be applied to an open-top battery container while the latter is in upright position.

Still another object of my invention is to provide improved testing apparatus of this character having one or more pairs of electrodes spaced to receive wall portions of the battery container therebetween and which is so constructed that the mere application of the device to the battery container causes the electrodes to straddle the wall portions to be tested and also causes closing of the testing circuit.

A further object of my invention is to provide improved testing apparatus of this character in which the testing device has pairs of depending electrode carriers arranged to enter a multiple-cell battery container and straddle the partition walls thereof when the device is applied to such a battery container.

It is also an object of this invention to provide an improved tester of this character in which provision is made for adjusting the spacing of the pairs of electrodes to adapt the device for use with battery containers having their partitions, or other walls portions to be tested, spaced different distances apart.

Other objects and advantages of my invention will be apparent from the following description when taken in conjunction with the accompanying sheets of drawings in which:

Fig. 1 is a partial elevational view showing my improved apparatus for electrically testing battery boxes or containers;

Fig. 2 is a side elevation illustrating the construction and manner of use of a portable testing device embodying my invention;

Fig. 3 is a plan view of the device with portions thereof broken away;

Fig. 4 is an end view of the device;

Fig. 5 is a transverse sectional view taken through the device as indicated by line 5—5 of Fig. 4;

Fig. 6 is a partial vertical sectional view taken on line 6—6 of Fig. 3;

Fig. 7 is a partial side elevation of the device showing the switch for closing the testing circuit; and Fig. 8 is a perspective view showing one of the electrodes in detached relation.

Further reference will now be made to the drawings for the purpose of describing the construction and use of my testing apparatus more in detail, and although I have disclosed but one embodiment of my invention, it will be understood, of course, that this is by way of example and that the invention may be embodied in various other testing devices and arrangements of this character.

Heretofore, in the testing of battery containers by the use of high voltage electric current it has been considered necessary to test all of the walls of the battery container or jar. As multiple-cell battery containers are now constructed, they are usually provided with relatively heavy or thick side and bottom walls and are molded under considerable pressure which ordinarily insures a solid body of material in those walls. The intercell partition walls are usually somewhat thinner than the outer or main walls of the container and are usually provided with spaced vertical ribs which are engaged by the battery elements and hold the latter spaced from the faces of the partition walls to provide electrolyte passages therebetween. Since the partition walls are relatively thinner than the outer walls of the battery container, it is now considered necessary to test only the partition walls because this is the place where imperfections will most likely occur if any are present in the battery container. My improved testing apparatus, as illustrated in the drawings and hereinafter to be described, was designed for the testing of the partition walls of a multiple-cell battery container, but it should be understood that the invention is also applicable to the testing of the outer walls of battery containers as well.

As shown in Fig. 1, my improved testing apparatus comprises a portable or manually movable testing device 10 which is adapted to be applied to or lowered into an open-top multiple-cell battery container 11. This testing device comprises in general a frame or carriage 12 having a handle 13 projecting therefrom by which the device can be conveniently manipulated, and one or more electrode units 14 depending from the frame or carriage and adapted to enter the open-top battery container 11 and straddle the partition walls thereof when the device is applied to the container by substantially straight-line relative movement.

My testing apparatus also includes a suitable frame or the like 15 having a table or conveyor portion 16 upon which the battery containers 11 may be supported in upright position and an overhead arm or bracket portion 17 from which the test device 10 may be suspended over the conveyor portion 16. The testing device may be suspended from the bracket portion 17 by means of a rope or cable 18 which is connected with the eye 19 of the handle 13 and extends out of a device 20 which is adapted to automatically take up the rope and substantially counterbalances the weight of the testing device.

The frame or carriage 12 of the testing device 10 may comprise a pair of laterally spaced bars or rails 22 which are connected adjacent their ends by cross bars and end plates 23 and 24, and with which the handle 13 is connected at an intermediate point by means of the arch-like structure 25. The spaced rails and other parts just mentioned can all be made of wood or any other suitable insulating material. The carriage 12 also includes a pair of laterally spaced contact rods 26, formed of metal or other suitable conducting material, and connected adjacent their ends with the cross bars 23 by means of the clamping nuts 27.

The electrode units 14 may each comprise a pair of spaced plate-like members or electrode carriers 28 formed of wood or any other suitable insulating material and electrodes 29 mounted on the adjacent faces of such carriers. When the wall portions to be tested are the pair of inter-cell partition walls 11a of a three-cell battery container, as shown in Fig. 2, I provide two of such depending electrode units 14. The paired electrode carriers 28 may be connected with each other by a spacing member or block 30 located adjacent the top or upper end of such carriers and which is of a thickness to hold the carriers spaced apart to receive a partition wall 11a therebetween when the testing device is lowered into the battery container.

The partition walls of the battery container may, as mentioned above, have vertical ribs 11b (see Fig. 5) thereon and I may provide the electrode carriers 28 with grooves 31 in their adjacent faces corresponding in number and arrangement with these ribs. The electrode carriers 28 are of a width only slightly less than the width of the partition walls 11a so that they may be readily lowered into and removed from the battery cells.

Since the partition walls 11a of the battery container are of relatively increased thickness at the points where the ribs 11b are located it is considered necessary to test only the sections or portions of the partition walls lying between the ribs. To this end the electrodes 29 may be made of a shape to enter the spaces between the ribs of the partition walls and to be located or positioned by the carriers adjacent the faces of these intermediate portions of the partition walls. The electrodes may be in the form of a plate or sheet of bronze or other conducting material, but preferably, as shown in the drawings, are in the form of strips 29a of a width to enter the spaces between the ribs of the partition walls and of a length corresponding substantially with the height of the partition walls.

The strips 29a may be electrically connected with each other by means of U-shaped portions 29b which may be recessed into the walls of the grooves 31. To facilitate the positioning of the electrodes 29 adjacent opposite faces of the partition walls, I may form the strips 29a out of a springy or resilient sheet metal and may give the strips a bowed shape, as shown in Fig. 2, which will cause them to be yieldingly pressed against the partition walls to thereby center the electrode carriers with respect to such walls. The lower ends of the strips 29a may be attached to the electrode carriers 28 while their bowed upper portions remain unconnected and have curved tips 29c adapted to slide on the carriers during flexing of the strips.

For connecting the electrode units 14 with the carriage 12, I may construct these units with upper ends of reduced width adapted to extend into the space between the side rails 22 and may provide each unit with a pair of contact sleeves 32 extending therethrough and surrounding the contact rods 26. The units 14 are shiftable in the carriage 12 for adjusting the spacing of the units to correspond with the spacing of the partitions or other wall portions to be tested and during such adjusting movement the contact sleeves 32 slide on the contact rods 26.

After such adjustment of the spacing of the electrode units 14 has been made it is desirable to clamp or lock the units to the carriage. For this purpose I may provide each unit with a clamping plate or cover 33 which overlies the rails 22 and pairs of clamping shoulders 34 engaging the lower edges of the rails. Clamping bolts 35 carried by the blocks 30 extend through the plates or covers 33 and are provided with wing-nuts 35a which, when tightened, draw the covers and shoulders into clamping engagement with opposite edges of the rails 22. The covers 33 can be connected with the carriage 12 and provided with slots for the bolts 35, but preferably, are not connected with the carriage so that they can shift along the rails 22 with the units 14 when adjustment of the latter is made.

The electrodes 29 of each unit are connected with the respective contact sleeves 32 thereof, as by means of wires 36 lying in grooves of the outer faces of the electrode carriers 28. Since the contact sleeves 32 are in engagement with the contact rods 26 the electrodes 29 will also be electrically connected with these rods. Electric current of appropriate voltage or potential differences may be supplied to the contact rods from a transformer or other appropriate current source by the conductors 37 and 38. The conductor 37 may be connected directly with one of the contact rods, but the conductor 38 is preferably connected with the other contact rod through a switch 39.

The switch 39 may be mounted on the carriage 12 and may comprise a pair of spring arms or contacts 39a and 39b which are normally separated but are adapted to be closed by a plunger 40 when the testing device 10 is applied to a battery container. The plunger 40 may be arranged, as shown in Fig. 7, with a portion thereof projecting below the carriage 12 so that when the testing device has been lowered into a battery container to its correct testing position, the plunger will engage the top edge of the battery container and will be lifted to cause closing of the switch contacts and completion of the testing circuit.

If either of the partition walls of the battery container is defective, a flow of current will take place through the defective portion of the wall from one electrode to the other and the noise of this disruptive electric discharge, or the indication of some appropriate signal device, will inform the operator that the battery container is defective. After the test has been completed, the device 10 is lifted out of the container. The initial separating movement between the testing device and the battery container will release the plunger 40 permitting the switch 39 to reopen and break the testing circuit.

Battery containers of the type to be tested by my apparatus usually have bottom rests 11c therein in the form of ribs extending between the partition walls and between the partition walls and the end walls of the container. By constructing the electrodes 29 in the form of the strips 29a, it will be seen that they can be moved downwardly between the bottom rests 11c for testing the portions of the partition walls lying adjacent such bottom rests. To permit the lower ends of the electrode carriers 28 to also enter the spaces between the bottom rests 11c, I form these carriers with appropriate slots 41 adjacent their lower ends so that the finger portions 41a on which the electrode strips 29a are mounted can straddle the bottom rests.

From the foregoing description and the accompanying drawings, it will now be readily seen that I have provided improved apparatus for electrically testing one or more walls of storage battery containers. It will also be seen that my improved apparatus is of simplified form and comprises mainly a device which is portable or manually movable and adapted to be quickly and easily applied to an open-top battery container while the latter is in an upright position. Moreover, it will be seen that in my improved device provision is made for adjustment of the location of the electrodes to thereby adapt the device for use with battery containers in which there is variation of the spacing of the walls to be tested. Likewise, it will be seen that in the use of my improved device the mere application of the device to a battery container causes the testing circuit to be closed when the device is in its proper testing position and the mere removal of the device from the battery container causes the testing circuit to be automatically opened.

While I have illustrated and described my improved apparatus for testing battery containers in a more or less detailed manner, it will be understood, of course, that I do not wish to be limited to the details of construction and arrangements herein disclosed, but regard my invention as including such changes and modifications as do not constitute a departure from the spirit of the invention and the scope of the appended claims.

Having thus described my invention, I claim:

1. In apparatus for electrically testing a ribbed wall of a battery container, a carriage movable to a position adjacent the container and having a pair of members spaced to receive said ribbed wall therebetween, and electrodes carried by said members and adapted to be charged with a difference of potential sufficient to reveal weakness in said wall, the electrode of at least one of said members comprising strips arranged to be brought adjacent the face of said wall between the ribs thereof.

2. In apparatus for electrically testing a ribbed wall of a battery container, a carriage movable to a position adjacent the container and having a pair of members spaced to receive said ribbed wall therebetween, and electrodes carried by said members and adapted to be charged with a difference of potential sufficient to reveal weakness in said wall, the electrode of at least one of said members comprising bowed resilient strips engageable in the spaces between the ribs of said wall.

3. In apparatus for electrically testing a partition wall of a multiple-cell battery container having a top opening and plate rests adjacent the bottom of the partition wall, a carriage movable to a position adjacent said top opening and having a pair of members spaced apart to receive said partition wall therebetween, said members having finger-like portions arranged to straddle said bottom rests, and electrodes on said members adapted to be charged with a difference of potential sufficient to reveal weakness in said partition wall and having spaced portions extending along said finger-like portions.

4. In apparatus for electrically testing spaced walls of an open-top battery container, a carriage movable to a position adjacent such open top and having contact rods extending transversely of said walls, electrode carriers depending from said carriage at points corresponding with the locations of said walls, said carriers each comprising a pair of plate-like members spaced to receive one of said walls therebetween and having contact sleeves surrounding said contact rods, electrodes on said carriers and connected with said sleeves and adapted to be positioned by the carriers adjacent opposite faces of said walls, and connections with said contact rods for charging said electrodes with a difference of potential.

5. In apparatus for electrically testing spaced walls of an open-top battery container, a carriage movable to a position adjacent such open top and having contact rods extending transversely of said walls, electrode carriers depending from said carriage and each comprising a pair of plate-like members spaced to receive one of said walls therebetween and having contact sleeves surrounding said contact rods, at least one of said carriers being connected with said carriage by means providing for adjustment of the spacing of the carriers to correspond substantially with the spacing of the walls to be tested, electrodes on said carriers and connected with said sleeves adapted to be positioned by the carriers adjacent opposite faces of said walls, and connections with said rods for charging said electrodes with a difference of potential.

6. In apparatus for testing the partition walls of multiple-cell open-top battery containers, means for supporting a battery container in upright position, a testing device suspended from above said supporting means and adapted to be lowered onto the top of said container, said device having pairs of depending spaced electrodes adapted to enter the battery container and straddle said partition walls, connections for charging said electrodes with a difference of potential, and means for substantially counterbalancing the weight of said testing device.

7. In battery container testing apparatus a device adapted to be applied to a battery container for testing spaced walls thereof, comprising a carriage having spaced rails and covers extending thereacross, electrode carriers arranged in pairs and each pair adapted to receive one of said spaced walls therebetween, said carriers having shoulders engageable with said rails, electrodes on said carriers and adapted to be positioned thereby adjacent opposite faces of said walls, and means holding said shoulders and covers in clamping engagement with said rails and being releasable to permit adjustment of the spacing of said pairs of carriers.

ELMER A. SCHMIDT.